No. 852,937. PATENTED MAY 7, 1907.
H. W. EDEN.
ELECTRICALLY ACTUATED SIGNAL BELL.
APPLICATION FILED JULY 18, 1906.

WITNESSES
May E. Kott.
Lotta Lee Hayton.

INVENTOR
Harold W. Eden
By Parker & Burton,
Attorneys.

UNITED STATES PATENT OFFICE.

HAROLD W. EDEN, OF DETROIT, MICHIGAN, ASSIGNOR TO P. R. MANUFACTURING COMPANY, OF DETROIT, MICHIGAN, A CORPORATION OF MICHIGAN.

ELECTRICALLY-ACTUATED SIGNAL-BELL.

No. 852,937.   Specification of Letters Patent.   Patented May 7, 1907.

Application filed July 18, 1906. Serial No. 326,645.

*To all whom it may concern:*

Be it known that I, HAROLD W. EDEN, a citizen of the United States, residing at Detroit, county of Wayne, State of Michigan, have invented a certain new and useful Improvement in Electrically-Actuated Signal-Bells; and I declare the following to be a full, clear, and exact description of the same, such as will enable others skilled in the art to which it pertains to make and use the same, reference being had to the accompanying drawings, which form a part of this specification.

This invention relates to electrically actuated signal bells; it has for its object an improved trunnion bearing for the armature of such bells.

Figure 2:
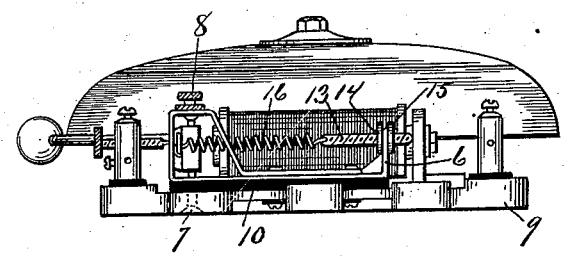
Figure 1:
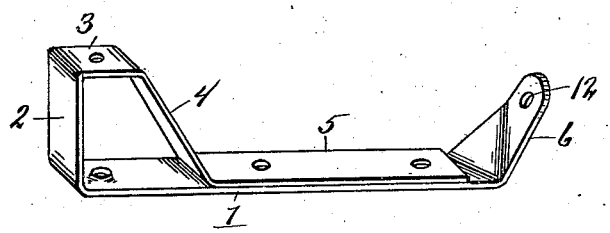

In the drawings:—Figure 1, is a perspective of the trunnion bearing. Fig. 2, is an elevation of a bell having such bearing.

The bearing which forms the subject of this invention is made from a single sheet of metal bent to form, the base 1, and upright or bracket 2, a pivot support 3, a brace 4, a lap base 5, and an arm 6, which supports the end of a screw used to regulate the tension of the retractile spring.

The armature is held between cone bearings one of which is at the end of a screw 7, inserted from below through the metal base which supports the entire structure. The other cone bearing is at the end of a screw 8, inserted through the pivot support 3, and pointing toward the point of the screw 7, and axially in line with the screw 7. The bearing itself is held to the base 9 by screws insulated from the base 9 and inserted through an insulating block 10, that underlies the bearing and overlies the base. The screw 7 is insulated from the base in the ordinary and well known way.

At the end of the bearing is an arm 6, provided with a perforation 12 through which is passed a shank of a screw 13 held in place by nuts 14 and 15, one on each side of an arm, and which itself is attached to the end of a tension spring 16, that retracts the armature after it has been actuated by the magnet.

What I claim is:—

1. A bearing for the trunnions of the armatures of electrically actuated bells, consisting of a single strip of metal bent to form the lower bearing, the upper bearing, a support for the upper bearing and a bracing support for the upper bearing, substantially as described.

2. A bearing for the armatures of electrically actuated bells, consisting of a strip of metal bent to form an upper bearing, a support for the upper bearing, a bracing support for the upper bearing, and an arm for the tension adjusting screw, substantially as described.

In testimony whereof, I, sign this specification in the presence of two witnesses.

HAROLD W. EDEN.

Witnesses:
　LOTTA LEE HAYTON,
　CHARLES F. BURTON.